(12) United States Patent
Shaeffer et al.

(10) Patent No.: US 10,923,015 B2
(45) Date of Patent: Feb. 16, 2021

(54) ADAPTIVE EMISSION CLOCKING CONTROL FOR DISPLAY DEVICES

(71) Applicant: Apple Inc., Cupertino, CA (US)

(72) Inventors: Derek K. Shaeffer, Redwood City, CA (US); Hopil Bae, Palo Alto, CA (US); Yafei Bi, Los Altos Hills, CA (US); Wei H. Yao, Palo Alto, CA (US); Xiaofeng Wang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/335,148

(22) PCT Filed: Sep. 20, 2017

(86) PCT No.: PCT/US2017/052572
§ 371 (c)(1),
(2) Date: Mar. 20, 2019

(87) PCT Pub. No.: WO2018/057659
PCT Pub. Date: Mar. 29, 2018

(65) Prior Publication Data
US 2019/0279552 A1    Sep. 12, 2019

Related U.S. Application Data

(60) Provisional application No. 62/398,694, filed on Sep. 23, 2016.

(51) Int. Cl.
*G09G 3/20*    (2006.01)
*G09G 3/3225*    (2016.01)
*G06F 1/06*    (2006.01)
*G09G 3/3266*    (2016.01)

(52) U.S. Cl.
CPC .............. *G09G 3/2014* (2013.01); *G06F 1/06* (2013.01); *G09G 3/2003* (2013.01); *G09G 3/2022* (2013.01); *G09G 3/3225* (2013.01); *G09G 3/3266* (2013.01); *G09G 2310/08* (2013.01); *G09G 2330/021* (2013.01)

(58) Field of Classification Search
CPC .. G09G 3/2014; G09G 3/2003; G09G 3/2022; G09G 3/3225; G09G 3/3266; G09G 3/3208; G06F 1/06; G06F 1/10
See application file for complete search history.

(56) References Cited

U.S. PATENT DOCUMENTS

| 7,663,580 B2 | 2/2010 | Shin | |
| 7,738,001 B2* | 6/2010 | Routley | G09G 3/3216 327/108 |
| 7,825,881 B2 | 11/2010 | Shin | |
| 8,619,008 B2* | 12/2013 | Cok | G09G 3/20 345/83 |

(Continued)

*Primary Examiner* — Sardis F Azongha
(74) *Attorney, Agent, or Firm* — Fletcher Yoder, P.C.

(57) ABSTRACT

A display device may include a plurality of pixels that may display image data on a display. The display device may also include a circuit that may receive pixel data including a gray level for at least one pixel of the plurality of pixels. The circuit may then receive an emission clock signal using a clock circuit based on the pixel data, such that the emission clock signal may cause the at least one pixel to receive a current for an amount of time based on the gray level. The circuit may then gate off the clock circuit after the amount of time.

20 Claims, 16 Drawing Sheets

(56) References Cited

U.S. PATENT DOCUMENTS

| | | | |
|---|---|---|---|
| 9,196,187 B2* | 11/2015 | Holland | G09G 3/20 |
| 9,418,589 B2 | 8/2016 | Kim et al. | |
| 9,640,108 B2* | 5/2017 | Cok | G09G 3/2003 |
| 9,812,083 B2* | 11/2017 | Yen | G09G 3/3674 |
| 2003/0222893 A1* | 12/2003 | Koester | G06F 3/1446 |
| | | | 345/691 |
| 2007/0263016 A1 | 11/2007 | Naugler, Jr. et al. | |
| 2010/0283769 A1* | 11/2010 | Lee | G09G 3/2096 |
| | | | 345/204 |
| 2011/0205259 A1* | 8/2011 | Hagood, IV | G09G 3/2003 |
| | | | 345/690 |
| 2011/0298768 A1 | 12/2011 | Yeo et al. | |
| 2016/0163253 A1 | 6/2016 | Chaji et al. | |

* cited by examiner

| PORT CONFIGURATION | INPUT MUX | OUTPUT MUX | DONE MUX |
|---|---|---|---|
| RX Rx | C | G | D |
| Tx | G | C | G |

ADAPTIVE EMISSION CLOCKING CONTROL FOR DISPLAY DEVICES

CROSS REFERENCE TO RELATED APPLICATION

This application is a national stage filing of PCT Application Serial No. PCT/US2017/052572, filed Sep. 20, 2017, and entitled "Adaptive Emission Clocking Control for Display Devices," which claims priority from and the benefit of U.S. Provisional Application Ser. No. 62/398,694, filed Sep. 23, 2016 entitled "Adaptive Emission Clocking Control for Display Devices," both of which are incorporated by reference herein in their entireties.

BACKGROUND

The present disclosure relates generally to electronic display devices that depict image data. More specifically, the present disclosure relates to systems and methods for saving power in circuits used to control pixels and/or sub-pixels in electronic displays.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

As electronic displays are employed in a variety of electronic devices, such as mobile phones, televisions, tablet computing devices, and the like, manufacturers of the electronic displays continuously seek ways to reduce the amount of the power used by the electronic displays. In a given display device, a number of circuit components are employed to depict a certain gray level for display by each pixel of an electronic display. When pixels of different colors are programmed with particular gray levels, images appear on the electronic display. The acts of programming the pixels of the electronic display and displaying images on the electronic display all consume power. Yet as more power is consumed by the electronic display, less power may be available for other components in an electronic device.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In certain electronic display devices, light-emitting diodes such as organic light-emitting diodes (OLEDs), micro-LEDs (µLEDs), or active matrix organic light-emitting diodes (AMOLEDs) may be employed as pixels to depict a range of gray levels for display. Each pixel or sub-pixel of an LED (e.g., µ-LED subpixels) may be controlled by a pixel driving circuit, which may be referred to as a micro-driver (µD). The pixel driving circuit may control the gray level depicted by the respective pixel using a digital scheme, which may include providing a constant current value to the respective pixel for a certain amount of time, such that the gray level depicted by the pixel directly corresponds to the amount of time that the current is provided to the respective pixel. With this in mind, each pixel driving circuit may include an emission clock circuit (e.g., comparator) that cycles or toggles on and off to enable the pixel driving circuit to keep track of time. In operation, the pixel driving circuit may receive pixel data indicative of a gray level to be depicted by the respective pixel and may use the cycling of the respective clock circuit to determine an amount of time that a current is to be provided to the respective pixel to achieve the gray level that corresponds to the pixel data. The pixel driving circuit may thus enable the respective pixel to emit for the determined amount of time, thereby depicting the appropriate gray level, and then the pixel driving circuit may disable (e.g., remove the emission signal) the respective pixel after the amount of time has expired. Afterwards, the clock component of the pixel driving circuit may continue to cycle even though the respective pixel is no longer emitting. This continuous toggling of clock components in numerous pixel circuits after the pixels have stopped depicting image data results in an inefficient use of power by the overall display device.

To improve the power efficiency of the display device, in one embodiment, a display driver circuit (e.g., pixel row driving circuit, pixel driving circuit) of a display device may determine a maximum gray level that is to be depicted on a respective set of pixels based on the pixel data provided to each pixel of the respective set of pixels. Based on the maximum gray level, the display driver circuit may provide a clock signal having a number of cycles (e.g., toggles) that corresponds to the maximum gray level downstream to the respective pixel circuits. Each respective pixel circuit may then use the provided clock signal to determine a gray level that should be depicted by the respective pixel. After the display driver circuit provides the clock signal downstream to the respective pixel circuits, the display driver circuit may then gate or turn off the clock that generates the clock signal. As a result, the clock does not toggle when the display driver circuit is done emitting gray levels for respective pixels. During the course of operation, the aggregated power savings achieved by avoiding the unnecessary toggling of a number of clocks in the display device may assist the corresponding computing device to operate longer using a battery source. Moreover, this improved clocking scheme may generally improve the use of power by the computing device.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
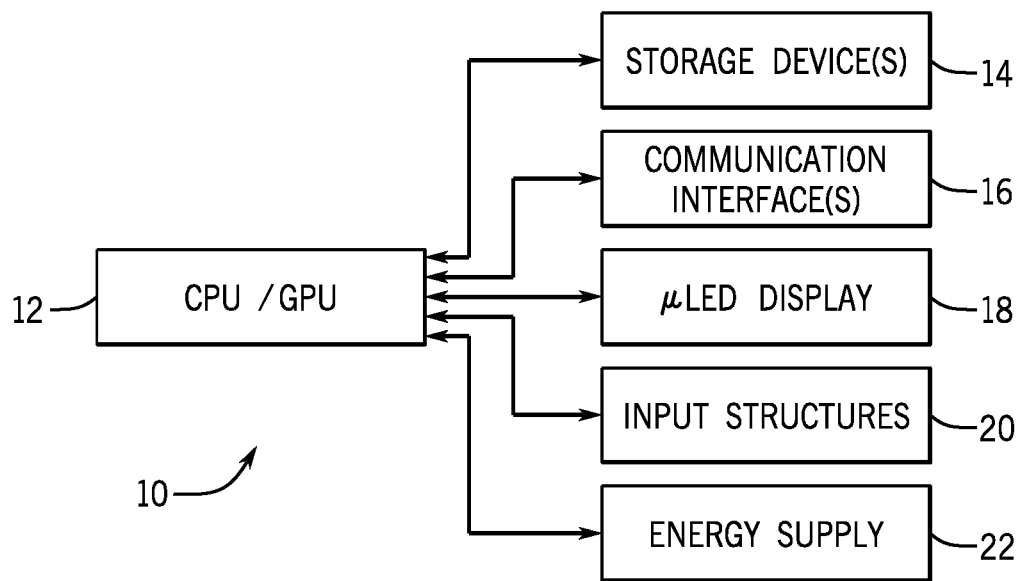
FIG. 1 is a block diagram of components of an electronic device that may include a micro-light-emitting-diode (µ-LED) display, in accordance with embodiments described herein.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Row drivers and column drivers may be used to distribute clock and/or emission controls and image data for an electronic display. In particular, the row and column drivers, in combination, enable the display to accurately pinpoint intersections where pixels may be programmed. For example, a micro-driver may be located at a row and column intersection accessible to the row and column drivers. Each micro-driver may drive multiple pixels, each of which may include several subpixels (e.g., red, green, and blue subpixels). The subpixels may be self-emissive organic light emitting diodes (OLEDs) or micro-light-emitting-diodes (µ-LEDs).

Generally, micro-light-emitting-diode (µ-LED) display devices are current driven devices and use current sources to provide certain amount of current to a respective pixel electrode for a certain amount of time to generate a certain level of luminance. With this in mind, micro-drivers may use pulse width modulation (PWM) to digitally control the gray level depicted by the respective pixel. In some instances, a display driver circuit may provide an emission clock signal to a micro-driver that controls an emission of a respective pixel.

In operation, the micro-driver may receive pixel data that indicates a desired gray level for a respective pixel depicting some image data. The micro-driver may use an emission clock circuit to control an amount of time in which the respective pixel may receive a certain current value, thereby controlling the gray level depicted by the respective pixel. In one embodiment, after the emission for a frame of image data is complete, the emission clock circuit of the micro-driver may be gated or turned off to prevent the emission clock circuit from continued operation after the respective pixel has completed its emission cycle. In this way, the emission clock circuit may not use power to continue operation (e.g., toggling) when the emission clock circuit is no longer used for depicting a gray level on the respective pixel.

After a pixel driver gates off its emission clock circuit, the pixel driver may send an indication that the respective emission clock circuit has been gated to another pixel driver located upstream. The upstream-located pixel driver may then gate its own emission clock circuit when the downstream pixel drivers have gated their respective emission clocks and when the upstream-located pixel has also stopped emitting. In this way, the network of pixel drivers may provide an emission clock distribution and clock network management that effectively reduces an amount power that may be used by the display device. Moreover, since the network of pixel drivers may gate their own respective clock circuits, the pixel drivers may no longer drive downstream pixel drivers, thereby reducing clock route parasitics within the display device. Additional details with regard to the systems and techniques involved with enabling the display driver to gate clock circuits after a respective set of pixels have completed its respective emission cycle is detailed below with reference to FIGS. 1-20.

By way of introduction, suitable electronic devices that may include a micro-LED (µ-LED or µ-LED) display are discussed below with reference to FIGS. 1-4. One example of a suitable electronic device 10 may include, among other things, processor(s) such as a central processing unit (CPU) and/or graphics processing unit (GPU) 12, storage device(s) 14, communication interface(s) 16, a µ-LED display 18, input structures 20, and an energy supply 22. The blocks shown in FIG. 1 may each represent hardware, software, or a combination of both hardware and software. The electronic device 10 may include more or fewer components. It should be appreciated that FIG. 1 merely provides one example of a particular implementation of the electronic device 10.

The CPU/GPU 12 of the electronic device 10 may perform various data processing operations, including generating and/or processing image data for display on the display 18, in combination with the storage device(s) 14. For example, instructions that can be executed by the CPU/GPU 12 may be stored on the storage device(s) 14. The storage device(s) 14 thus may represent any suitable tangible, computer-readable media. The storage device(s) 14 may be volatile and/or non-volatile. By way of example, the storage device(s) 14 may include random-access memory, read-only memory, flash memory, a hard drive, and so forth.

The electronic device 10 may use the communication interface(s) 16 to communicate with various other electronic devices or components. The communication interface(s) 16 may include input/output (I/O) interfaces and/or network interfaces. Such network interfaces may include those for a personal area network (PAN) such as Bluetooth, a local area network (LAN) or wireless local area network (WLAN) such as Wi-Fi, and/or for a wide area network (WAN) such as a long-term evolution (LTE) cellular network.

Using pixels containing an arrangement of pixels made up of µ-LEDs, the display 18 may display images generated by the CPU/GPU 12. The display 18 may include touchscreen functionality to allow users to interact with a user interface appearing on the display 18. Input structures 20 may also allow a user to interact with the electronic device 10. For instance, the input structures 20 may represent hardware buttons. The energy supply 22 may include any suitable source of energy for the electronic device. This may include a battery within the electronic device 10 and/or a power conversion device to accept alternating current (AC) power from a power outlet.

Figure 2:
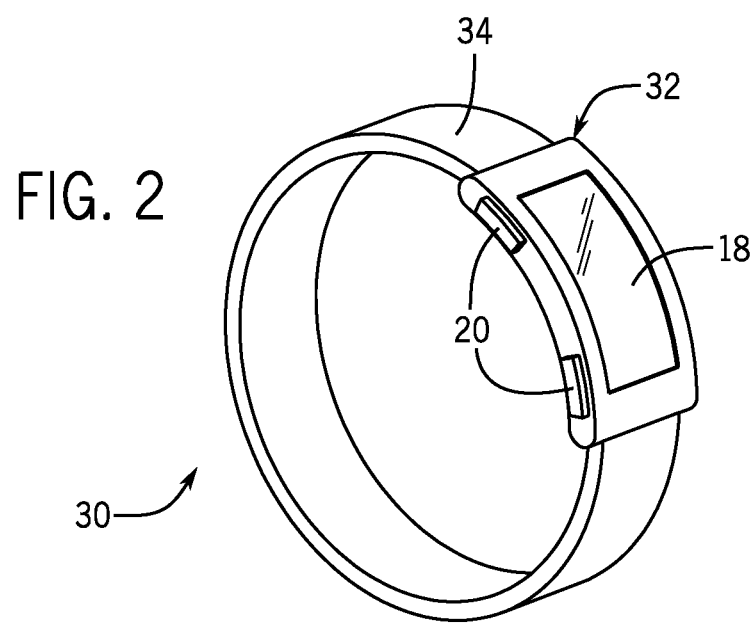
FIG. 2 is a perspective view of the electronic device in the form of a fitness band, in in accordance with embodiments described herein.
Figure 3:
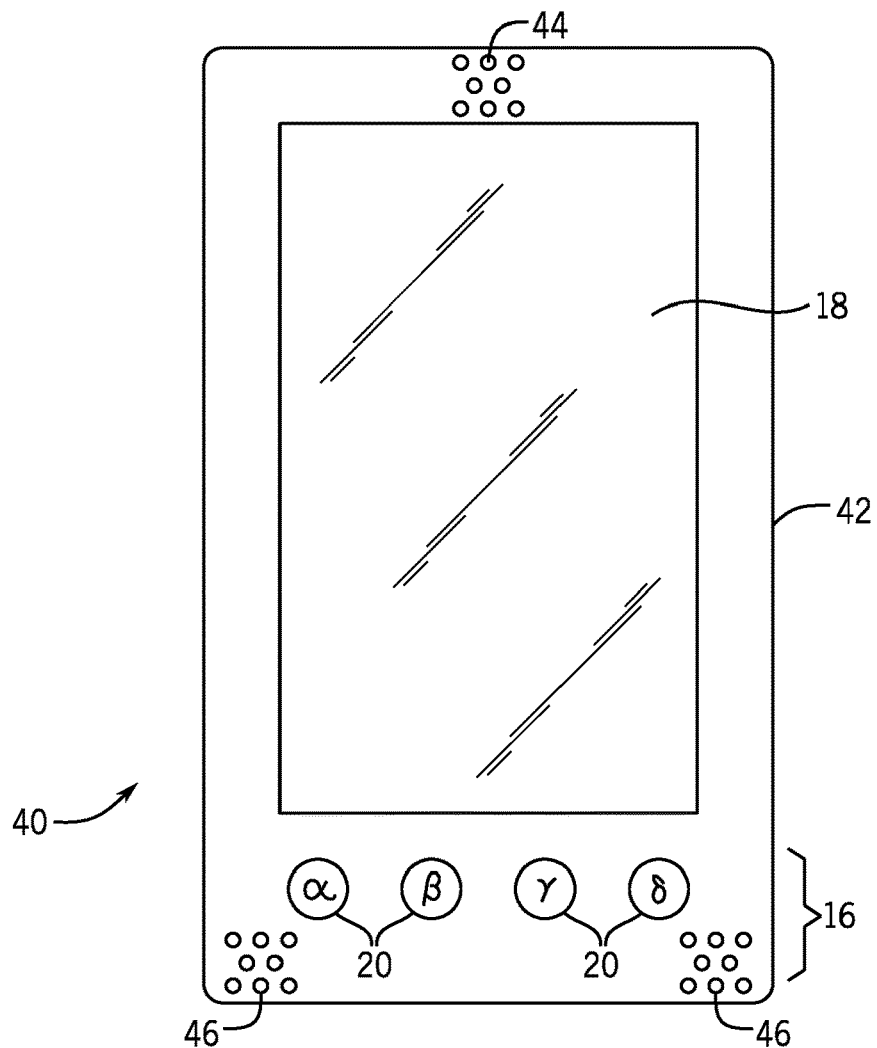
FIG. 3 is a front view of the electronic device in the form of a slate, in accordance with embodiments described herein.
Figure 4:
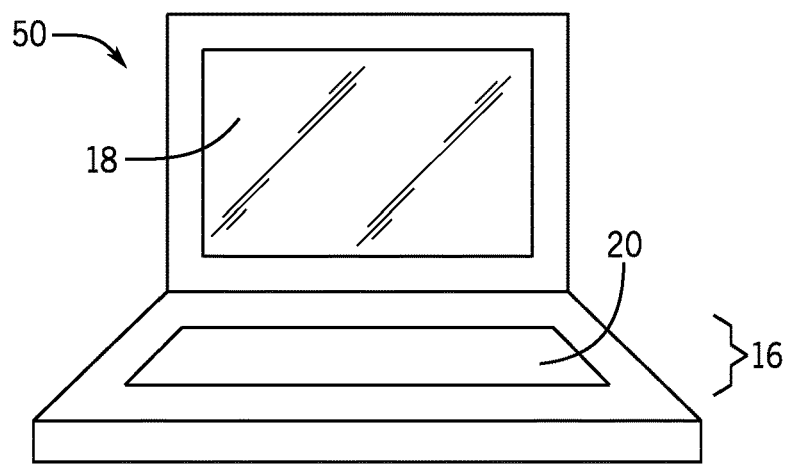
FIG. 4 is a perspective view of the electronic device in the form of a notebook computer, in accordance with embodiments described herein.

As may be appreciated, the electronic device 10 may take a number of different forms. As shown in FIG. 2, the electronic device 10 may take the form of a fitness band 30. The fitness band 30 may include an enclosure 32 that houses the electronic device 10 components of the fitness band 30. A strap 30 may allow the fitness band 30 to be worn on the arm or wrist. The display 18 may display information related to the operation of the fitness band 30. Additionally or alternatively, the fitness band 30 may operate as a watch, in which case the display 18 may display the time. Input structures 20 may allow a person wearing the fitness band 30 navigate a graphical user interface (GUI) on the display 18.

The electronic device 10 may also take the form of a slate 40. Depending on the size of the slate 40, the slate 40 may serve as a handheld device, such as a mobile phone, or a tablet-sized device. The slate 40 includes an enclosure 42 through which several input structures 20 may protrude. The enclosure 42 also holds the display 18. The input structures 20 may allow a user to interact with a GUI of the slate 40. For example, the input structures 20 may enable a user to make a telephone call. A speaker 44 may output a received audio signal and a microphone 46 may capture the voice of the user. The slate 40 may also include a communication interface 16 to allow the slate 40 to connect via a wired connection to another electronic device.

A notebook computer 50 represents another form that the electronic device 10 may take. It should be appreciated that the electronic device 10 may also take the form of any other computer, including a desktop computer. The notebook computer 50 shown in FIG. 4 includes the display 18 and input structures 20 that include a keyboard and a track pad. Communication interfaces 16 of the notebook computer 50 may include, for example, a universal serial bus (USB) connection.

Figure 5:
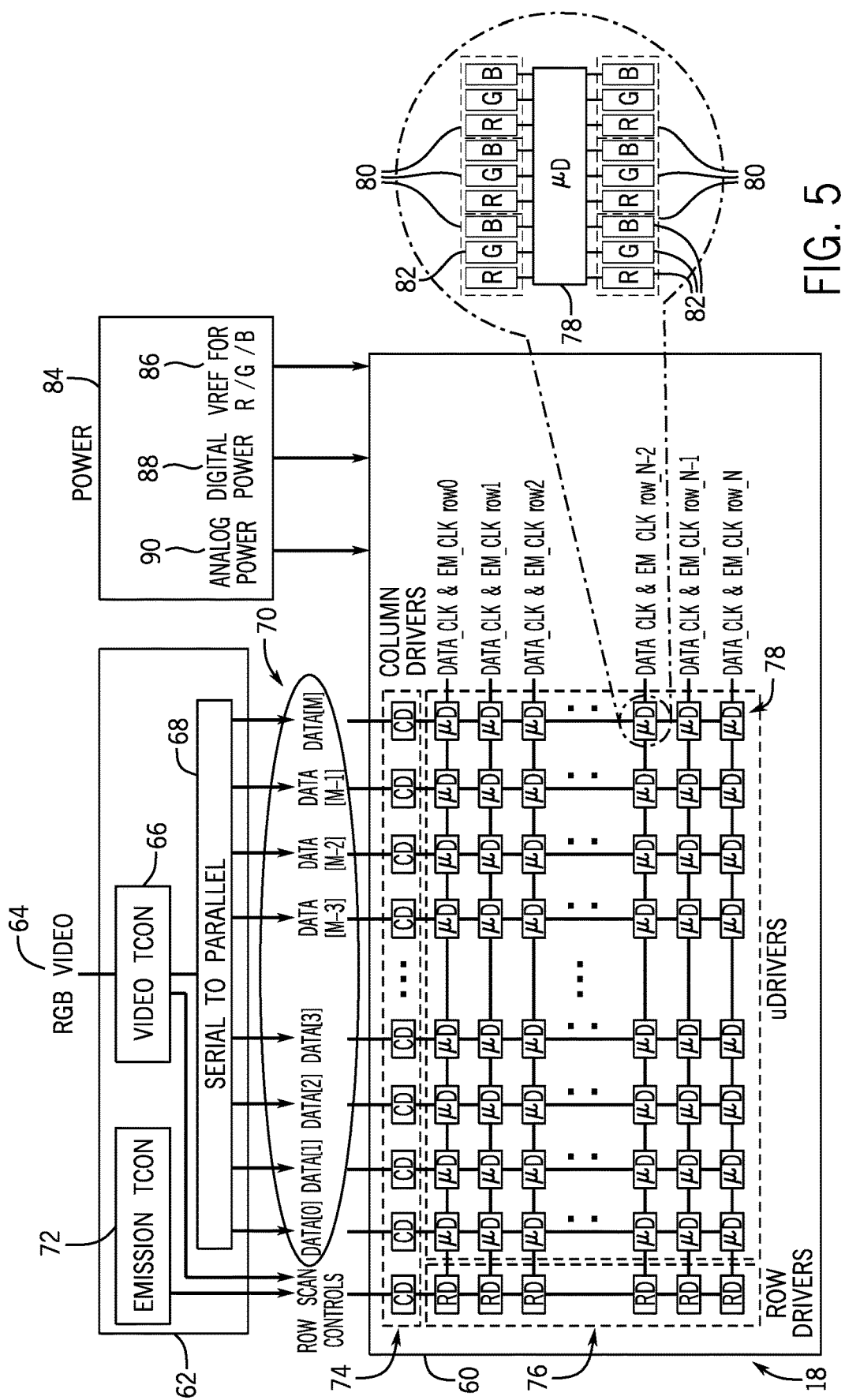
FIG. 5 is a block diagram of a µ-LED display that employs micro-drivers (µDs) to drive µ-LED subpixels with controls signals from row drivers (RDs) and data signals from column drivers (CDs), in accordance with embodiments described herein.

A block diagram of the architecture of the µt-LED display 18 appears in FIG. 5. In the example of FIG. 5, the display 18 uses an RGB display panel 60 with pixels that include red, green, and blue µ-LEDs as subpixels. Support circuitry 62 thus may receive RGB-format video image data 64. It should be appreciated, however, that the display 18 may alternatively display other formats of image data, in which case the support circuitry 62 may receive image data of such different image format. In the support circuitry 62, a video timing controller (TCON) 66 may receive and use the image data 64 in a serial signal to determine a data clock signal (DATA_CLK) to control the provision of the image data 64 in the display 18. The video TCON 66 also passes the image data 64 to serial-to-parallel circuitry 68 that may deserialize the image data 64 signal into several parallel image data signals 70. That is, the serial-to-parallel circuitry 68 may collect the image data 64 into the particular data signals 70 that are passed on to specific columns among a total of M respective columns in the display panel 60. As such, the data 70 is labeled DATA[0], DATA[1], DATA[2], DATA[3] . . . DATA[M−3], DATA[M−2], DATA[M−1], and DATA[M]. The data 70 respectively contain image data corresponding to pixels in the first column, second column, third column, fourth column . . . fourth-to-last column, third-to-last column, second-to-last column, and last column, respectively. The data 70 may be collected into more or fewer columns depending on the number of columns that make up the display panel 60.

As noted above, the video TCON 66 may generate the data clock signal (DATA_CLK). An emission timing controller (TCON) 72 may generate an emission clock signal (EM_CLK). Collectively, these may be referred to as Row Scan Control signals, as illustrated in FIG. 5. These Row Scan Control signals may be used by circuitry on the display panel 60 to display the image data 70. Although the emission timing controller (TCON) 72 is described as generating the emission clock signal, it should be noted that other circuit components (e.g., RDs 76, uDs 78) may also generate the emission clock signals.

In particular, the display panel 60 shown in FIG. 5 includes column drivers (CDs) 74, row drivers (RDs) 76, and micro-drivers (μDs or uDs) 78. Each μD 78 drives a number of pixels 80 having pt-LEDs as subpixels 82. Each pixel 80 includes at least one red pt-LED, at least one green μ-LED, and at least one blue pt-LED to represent the image data 64 in RGB format. Although the μDs 78 of FIG. 5 is shown to drive six pixels 80 having three subpixels 82 each, each μD 78 may drive more or fewer pixels 80. For example, each μD 78 may respectively drive 1, 2, 3, 4, 5, 6, 7, 8, 9, 10, 11, 12, or more pixels 80.

A power supply 84 may provide a reference voltage (VREF) 86 to drive the μ-LEDs, a digital power signal 88, and an analog power signal 90. In some cases, the power supply 84 may provide more than one reference voltage (VREF) 86 signal. Namely, subpixels 82 of different colors may be driven using different reference voltages. As such, the power supply 84 may provide more than one reference voltage (VREF) 86. Additionally or alternatively, other circuitry on the display panel 60 may step the reference voltage (VREF) 86 up or down to obtain different reference voltages to drive different colors of μ-LED.

To allow the μDs 78 to drive the μ-LED subpixels 82 of the pixels 80, the column drivers (CDs) 74 and the row drivers (RDs) 76 may operate in concert. Each column driver (CD) 74 may drive the respective image data 70 signal for that column in a digital form. Meanwhile, each RD 76 may provide the data clock signal (DATA_CLK) and the emission clock signal (EM_CLK) at an appropriate time to activate the row of μDs 78 driven by the RD 76. A row of μDs 78 may be activated when the RD 76 that controls that row sends the data clock signal (DATA_CLK). This may cause the now-activated μDs 78 of that row to receive and store the digital image data 70 signal that is driven by the column drivers (CDs) 74. The μDs 78 of that row then may drive the pixels 80 based on the stored digital image data 70 signal and the emission clock signal (EM_CLK).

Figure 6:
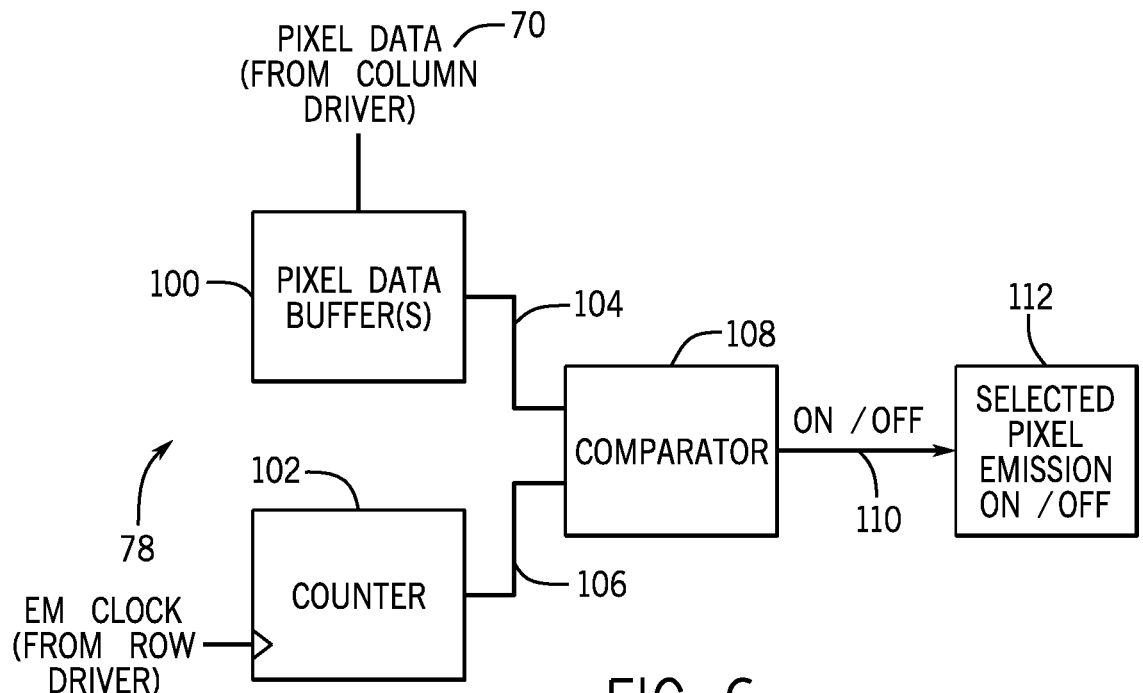
FIG. 6 is a block diagram schematically illustrating an operation of one of the micro-drivers (µDs), in accordance with embodiments described herein.

A block diagram shown in FIG. 6 illustrates some of the components of one of the μDs 78. The μD 78 shown in FIG. 6 includes pixel data buffer(s) 100 and a digital counter 102. The pixel data buffer(s) 100 may include sufficient storage to hold the image data 70 that is provided. For instance, the μD 78 may include enough pixel data buffer(s) 100 to store image data 70 for three subpixels 82 at any one time (e.g., for 8-bit image data 70, this may be 24 bits of storage). It should be appreciated, however, that the pixel data buffer(s) 100 may include more or fewer buffers, depending on the data rate of the image data 70 and the number of subpixels 82 included in the image data 70. Thus, in some embodiments, the pixel data buffer(s) 100 may include as few buffers as to hold image data for one subpixel 82 or as many as suitable (e.g., 4, 5, 6, 7, 8, 9, 10, 11, 12, and so forth). The pixel data buffer(s) 100 may take any suitable logical structure based on the order that the column driver (CD) 74 provides the image data 70. For example, the pixel data buffer(s) 100 may include a first-in-first-out (FIFO) logical structure or a last-in-first-out (LIFO) structure.

When the pixel data buffer(s) 100 has received and stored the image data 70, the RD 76 may provide the emission clock signal (EM_CLK). A counter 102 may receive the emission clock signal (EM_CLK) as an input. The pixel data buffer(s) 100 may output enough of the stored image data 70 to output a digital data signal 104 represent a desired gray level for a particular subpixel 82 that is to be driven by the μD 78. The counter 102 may also output a digital counter signal 106 indicative of the number of edges (only rising, only falling, or both rising and falling edges) of the emission clock signal (EM_CLK) 98. The signals 104 and 106 may enter a comparator 108 that outputs an emission control signal 110 in an "on" state when the signal 106 does not exceed the signal 104, and an "off" state otherwise. The emission control signal 110 may be routed to driving circuitry (not shown) for the subpixel 82 being driven, which may cause light emission 112 from the selected subpixel 82 to be on or off. The longer the selected subpixel 82 is driven "on" by the emission control signal 110, the greater the amount of light that will be perceived by the human eye as originating from the subpixel 82.

Figure 7:
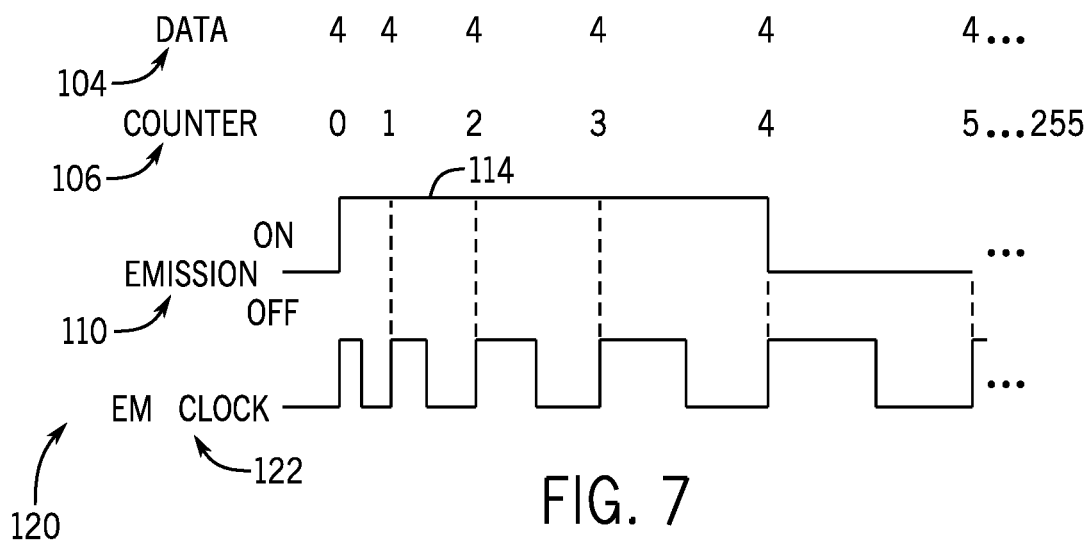
FIG. 7 is a timing diagram illustrating an example operation of the micro-driver (µD) of FIG. 6, in accordance with embodiments described herein.

A timing diagram 120, shown in FIG. 7, provides one brief example of the operation of the μD 78. The timing diagram 120 shows the digital data signal 104, the digital counter signal 106, the emission control signal 110, and the emission clock signal (EM_CLK) represented by numeral 122. In the example of FIG. 7, the gray level for driving the selected subpixel 82 is gray level 4, and this is reflected in the digital data signal 104. The emission control signal 110 drives the subpixel 82 "on" for a period of time defined as gray level 4 based on the emission clock signal (EM_CLK). Namely, as the emission clock signal (EM_CLK) rises and falls, the digital counter signal 106 gradually increases. The comparator 108 outputs the emission control signal 110 to an "on" state as long as the digital counter signal 106 remains less than the data signal 104. When the digital counter signal 106 reaches the data signal 104, the comparator 108 outputs the emission control signal 110 to an "off" state, thereby causing the selected subpixel 82 no longer to emit light.

It should be noted that the steps between gray levels are reflected by the timing between emission clock signal (EM_CLK) edges. That is, based on the way humans perceive light, to notice the difference between lower gray levels, the difference between the amount of light emitted between two lower gray levels may be relatively small. To notice the difference between higher gray levels, however, the difference between the amount of light emitted between two higher gray levels may be comparatively much greater. The emission clock signal (EM_CLK) therefore may use relatively short time intervals between clock edges at first. To account for the increase in the difference between light emitted as gray levels increase, the differences between edges (e.g., periods) of the emission clock signal (EM_CLK) may gradually lengthen. The particular pattern of the emission clock signal (EM_CLK), as generated by the emission TCON 72, may have increasingly longer differences between edges (e.g., periods) so as to provide a gamma encoding of the gray level of the subpixel 82 being driven.

Figure 8:
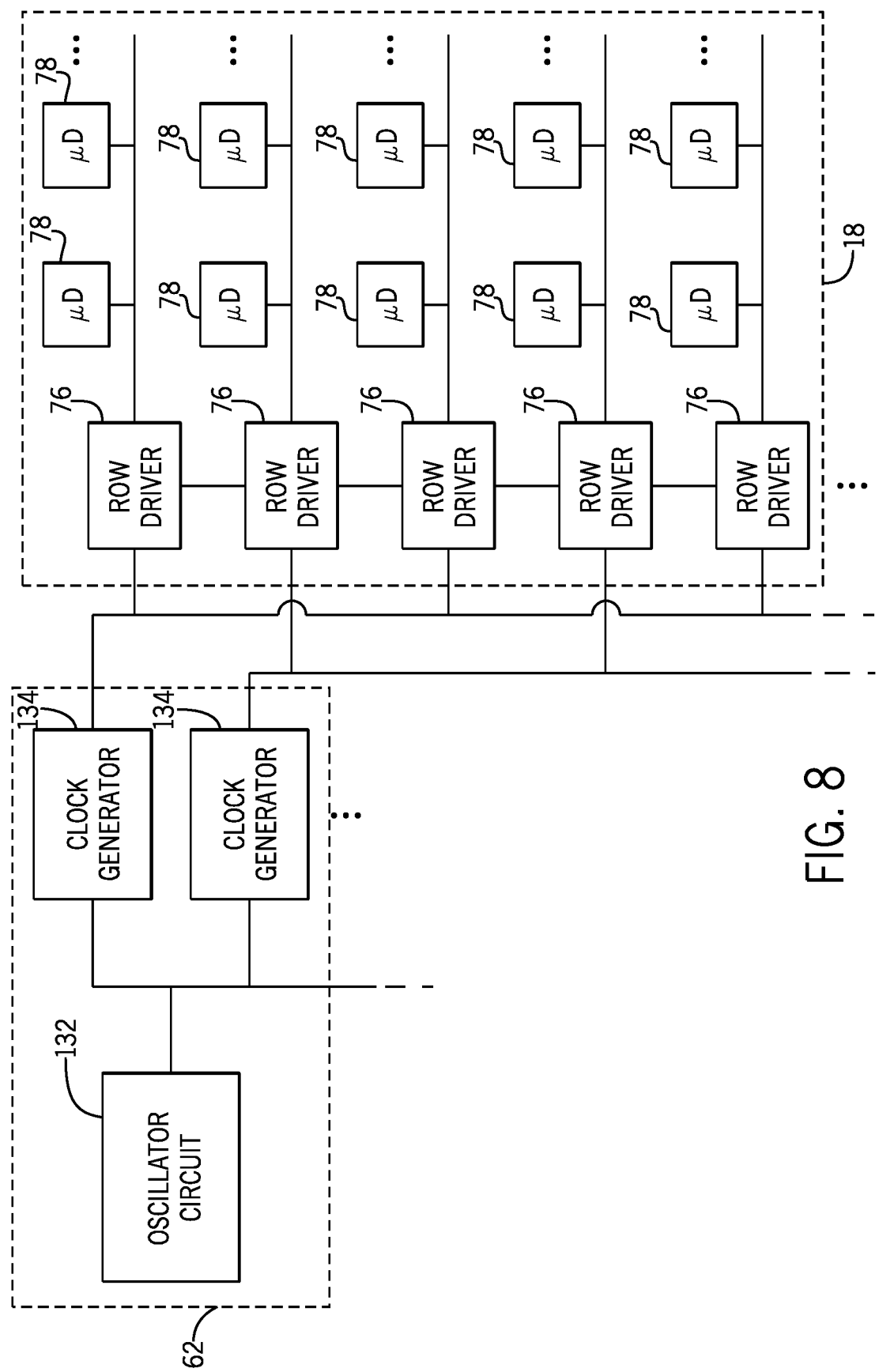
FIG. 8 is a block diagram illustrating example circuit components that may use an emission clock signal to control a pixel of a display of the electronic device of FIG. 1, in accordance with embodiments described herein.

With the foregoing in mind, FIG. 8 illustrates circuit components that may be part of the support circuitry 62 and the display 18. As discussed above, the support circuitry 62 may provide the emission clock signal (EM_CLK), which may be routed to a respective pixel 80 or subpixel 82 of the display 18. In one embodiment, the support circuitry 62 may include an oscillator circuit 132 that may generate a periodic, oscillating electronic signal, such as a sine wave or a square wave that may be used as a clock signal for determining an amount of time. In some embodiments, the oscillator circuit 132 may be coupled to one or more clock generators 134. The clock generators 134 may use the clock signal provided by the oscillator circuit 132 to generate an emission clock signal (EM_CLK) output by the emission (TCON) 72 discussed above.

In some cases, the clock generator 134 may provide different emission clock signals for pixels located along different rows, for sub-pixels 82 that output different colors, and for various other permutations. In any case, a clock circuit (e.g., counter 102) that is used to generate the emission clock signal toggles as time passes on. Each toggle of this clock circuit dissipates a certain amount of power. Accordingly, by toggling a clock circuit less, the display 18 will dissipate or use less power.

The RDs 76 may provide a clock signal to pixels located along the same row as the respective RD 76. In one embodiment, the clock generator 134 may provide emission clock signals to respective RDs 76, which may be coupled to a number of uDs 78. The RD 76 may then provide emission clock signals to the pixels 80 located along a particular row of the display 18 via the uDs 78. Like the clock generator 134 discussed above, the RD 76 may include a counter or clock circuit that toggles based on the emission clock signal received from the clock generator 134. As such, the RD 76 may control the gray level depicted by each pixel 80 along a particular row of pixels based on the counter or clock circuit.

For instance, if a pixel 80 coupled to a particular RD 76 is to depict a certain gray level that corresponds to a certain amount of time in which a current is to be provided to the respective pixel 80, a respective μD 78 may use the clock signal or counter provided by the respective RD 76 to determine when the certain amount of time has expired. As such, the μD 78 may provide the current to the pixel for the certain amount of time, thereby causing the respective pixel 80 to render the desired gray level.

As mentioned above, in some embodiments, the μD 78 may also include a counter 102 or some other circuit component that toggles to keep count of the amount of emission clock pulses that have been received or the amount of time that the pixel 80 receives the current. In this case, the μD 78 may toggle its counter 102 to keep track of an amount of time in which current may be provided to a respective pixel 80 to depict a certain gray level. After the desired amount of time expires, the μD 78 may remove an emission signal from the respective pixel 80 to prevent the respective pixel from emitting any light. In one embodiment, after the respective pixel 80 has completed this emission cycle, the μD 78 may then gate off the counter 102 to prevent the counter 102 from toggling any further. As a result, the counter 102 uses a lower amount of power after the respective pixel 80 has completed its emission cycle, as compared to maintaining the count after the respective pixel 80 has completed its emission cycle.

In different embodiments, the clock generator 134, the RD 76, or the μD 78 may provide a clock signal for a respective pixel to use to illuminate a pixel 80 or sub-pixel 82 for a certain amount of time. In any case, the clock generator 134, the RD 76, or the μD 78 may gate or turn off its respective clock circuit our counter after a set of pixels that uses the respective clock circuit to determine an amount of time to provide current to each pixel 80 of the set completes its emission cycle. As a result, the clock generator 134, the RD 76, or the μD 78 may decrease the amount of power that its respective clock or counter circuits use when enabling pixels 80 to depict a certain gray level.

Figure 9:
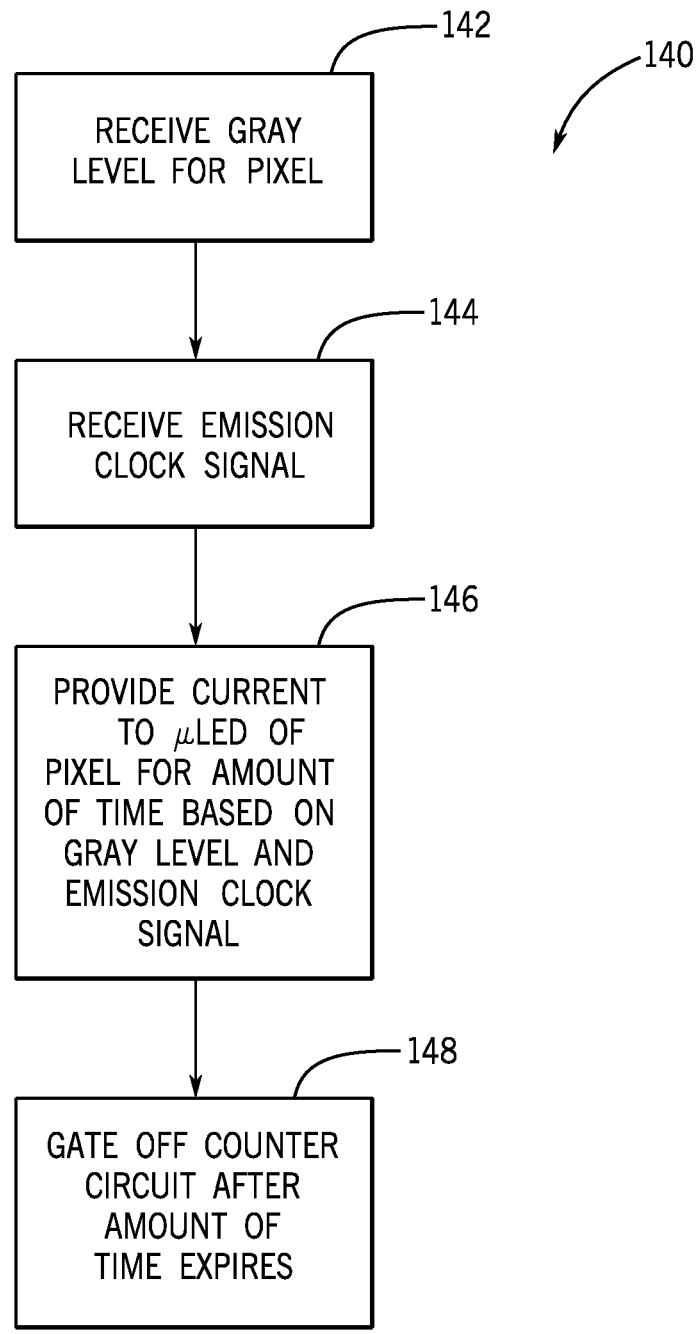
FIG. 9 is a flow chart of a method for generating a clock signal for a pixel in the display of the electronic device of FIG. 1, in accordance with embodiments described herein.

Keeping the foregoing in mind, FIG. 9 illustrates a method 140 for generating an emission clock signal to control a gray level depicted by a pixel 80 or a sub-pixel 82 in the display 18. Although the method 140 is described as being performed in a particular order, it should be understood that the method 140 may be performed in any suitable order. For the purposes of discussion, the following description of the method 140 will be discussed as being performed by the μD 78, but it should be understood that any suitable processor device, including the clock generator 134 or the RD 76, may perform the method 140.

Referring now to FIG. 8, at block 142, the μD 78 may receive a gray level value associated with a pixel 80 or a sub-pixel 82 in the display 18. The desired gray level may be stored in a local memory component, such as the pixel data buffer 100. As such, the μD 78 may access the local memory component and determine the desired gray level that is to be depicted by the pixel 80 or sub-pixel 82 in a frame of image data signals 70.

At block 144, the μD 78 may receive the emission clock signal (EM_CLK) via the RD 76, the clock generator 134, or the oscillator circuit 132. Using this emission clock signal (EM_CLK), the μD 78 may toggle the counter 102 to keep track of an amount of time in which current is provided to the μ-LED of the respective pixel 80. That is, the μD 78 may provide the current to the μ-LED until the comparator 108 changes state. As such, the μD 78 may cause the μ-LED to emit light for an amount of time that corresponds to the μ-LED depicting the requested gray level of block 142.

After the current has been provided to the μ-LED for the amount of time that corresponds to depicting the requested gray level, the μD 78 may, at block 148, gate off the counter 102. As a result, the μD 78 may reduce an amount of power consumed by the counter 102 if the counter 102 continued toggling based on the received emission clock signal even after the respective μ-LED stopped emitting light.

With the foregoing in mind, in some embodiments, the clock generator 134, the RD 76, or the μD 78 may keep track of an amount of time in which a number of μ-LEDs associated with a number of pixels 80 or sub-pixels 82 are provided with current to depict a certain gray level. For example, referring briefly back to FIG. 8, the clock generator 134 may provide an emission clock signal to each pixel electrically coupled to the clock generator 134. That is, the clock generator 134 may determine a gray level to be depicted by each pixel of a set of pixels electrically coupled to the clock generator 134 and may send an emission clock signal to each pixel that corresponds to each respective gray level. In some embodiments, the RD 76 may perform a similar operation for pixels 80 along the same row as the RD 76. Moreover, the μD 78 may also keep track of time for other pixels daisy-chained together, such that each of the daisy-chained pixels 80 may receive an emission clock signal from one particular μD 78.

Figure 10:
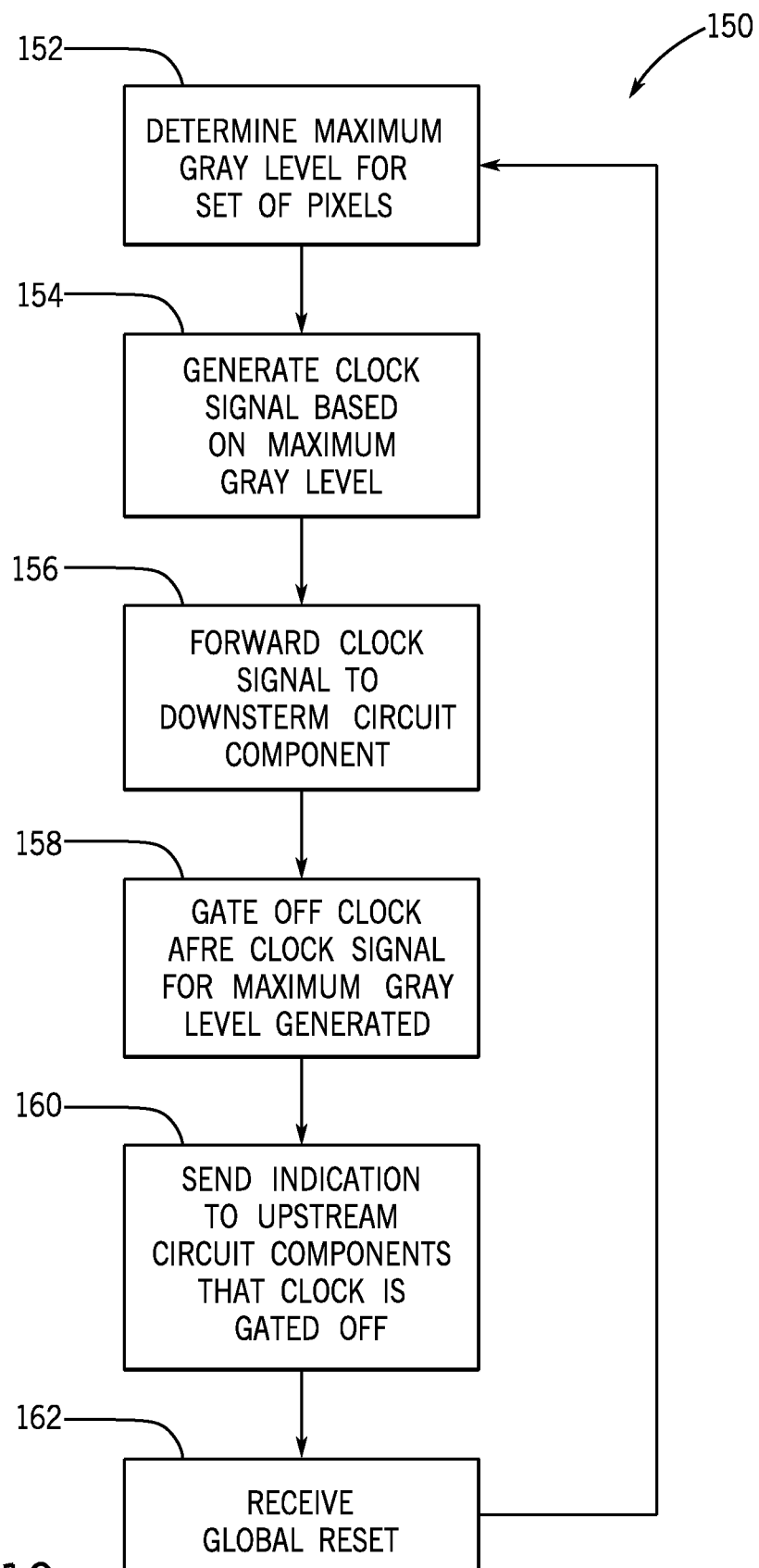
FIG. 10 is a flow chart of a method for providing a clock signal for a pixel in the display of the electronic device of FIG. 1, in accordance with embodiments described herein.

With the foregoing in mind, FIG. 10 illustrates a method 150 for distributing an emission clock signal from the clock generator 134, the RD 76, or the μD 78 to pixels 80 or sub-pixels 82 in the display 18. Although the method 150 is described as being performed in a particular order, it should be understood that the method 150 may be performed in any suitable order. For the purposes of discussion, the following description of the method 150 will be discussed as being performed by the RD 76, but it should be understood that any suitable processor device, including the clock generator 134 or the μD 78, may perform the method 150.

Referring now to FIG. 10, at block 152, the RD 76 may determine a maximum gray level for a set of sub-pixels 82 associated with the RD 76 or a set of pixels 82 positioned downstream (e.g., along daisy-chained pixels) from the RD 76. Each sub-pixel 82 or pixel 80 may receive pixel data that indicates a desired gray level for the respective sub-pixel 80 or pixel 82 for a particular frame of image data. That is, as discussed above, the desired gray level may be stored in a local memory component of the respective pixel. As such, the RD 76 may access the local memory components of the set of pixels 80 and determine a maximum gray level that is to be depicted by the pixels 80 in the set.

At block 154, the RD 76 may generate an emission clock signal based on the maximum gray level determined at block 152. As mentioned above, the gray level output by a pixel 80 may be generated by providing a current to the respective µ-LED for a certain amount of time. The emission clock signal generated by the RD 76 may be used to ensure that the current is provided to the µ-LED for the desired amount of time.

That is, at block 156, the RD 76 may forward or transmit a respective emission clock signal to each respective downstream pixel to cause each respective µ-LED to receive current for a respective amount of time based on a respective gray level. After the RD 76 transmits the emission clock signal to the pixel 80 having the highest gray level, at block 158, the RD 76 may gate off its clock or counter circuit used to keep track of time. Accordingly, the RD 76 does not waste power on cycling or toggling its clock or counter circuit to maintain track of time when the set of associated pixels 80 has completed its emission cycle.

At block 160, the RD 76 may send an indication to upstream circuit components, such as the clock generator 134, to indicate that the clock circuit of the RD 76 has been gated off. In this way, the support circuitry 62 may control the distribution of clock signals throughout various circuit components of the display 18, thereby reducing the amount of power employed by the circuit components to toggle clock or counter circuits.

After the indication has been sent to upstream circuit components, at block 162, the RD 76 may receive a global reset signal to indicate that a new frame of image data is ready to be processed. As such, the RD 76 may return to block 152 and perform the method 150 again to depict the image data of a subsequent frame via the display 18.

Figure 11:
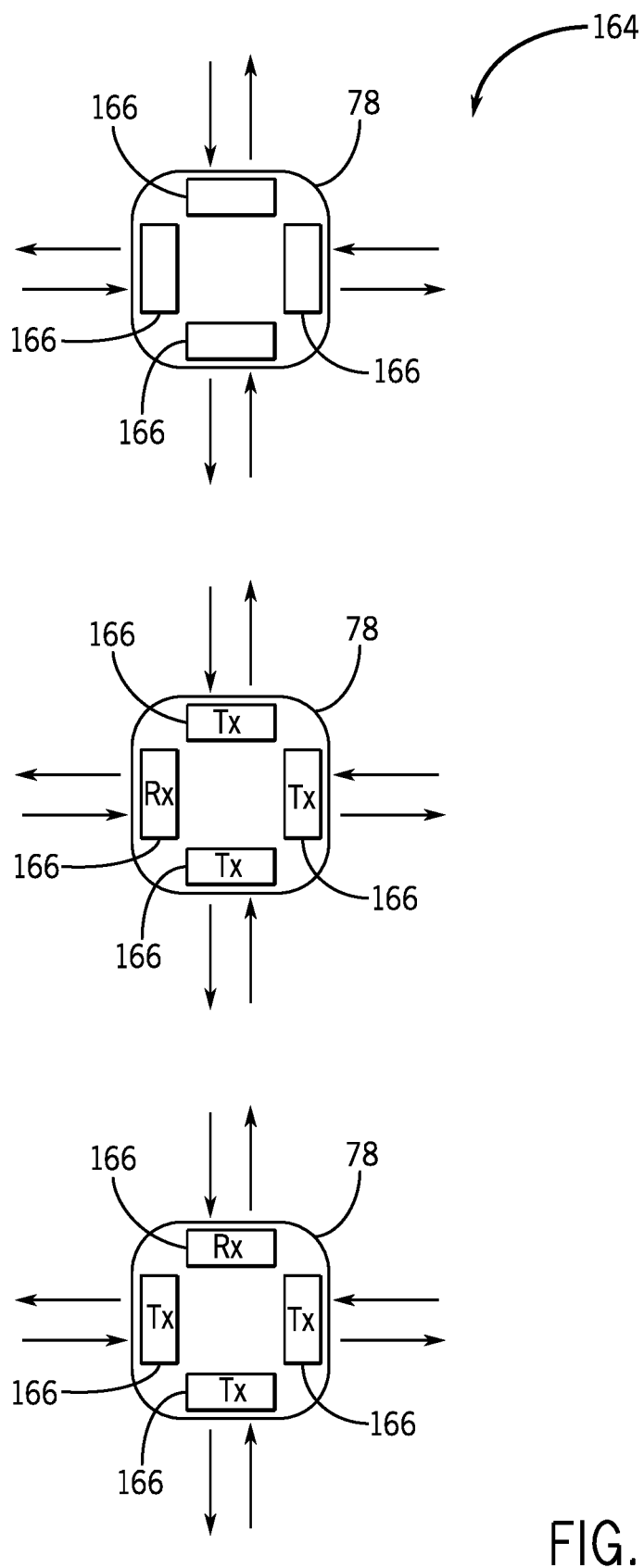
FIG. 11 illustrates example inputs and outputs of a pixel driving circuit for a pixel in the display of the electronic device of FIG. 1, in accordance with embodiments described herein.

As discussed above, in certain embodiments, the µD 78 may transmit emission clock signals to downstream pixels 80 of the display 18. With this in mind, FIG. 11 illustrates a schematic diagram 164 of sample inputs and outputs that may be part of the µD 78. As shown in FIG. 10, the µD 78 may include communication ports 166 disposed at each side of the µD 78. The ports 166 may be configurable as a receive port (Rx) or a transmit port (Tx).

In one embodiment, the µD 78 may include one receive port (Rx) and three transmit ports (Tx) as illustrated in FIG. 11. The receive port (Rx) and the transmit port (Tx) may be positioned at any side of the µD 78. The transmit port (Tx) may transmit emission clock signals generated by the µD 78 or received by the µD 78 to µDs 78 coupled directly to the respective µD 78. In the same manner, the µD 78 may receive data (e.g., gray levels, indication that clock circuit is gated off) from the adjacent µDs 78, as mentioned above, via the transmit ports (Tx). Although the receive ports (Rx) and transmit ports (Tx) are depicted in certain positions in FIG. 11, it should be noted that the receive ports (Rx) and transmit ports (Tx) may be positioned in any suitable arrangement.

The µD 78 may receive an emission clock signal, a global reset, or other inputs via the receive port (Rx). By way of example, the RD 76 may provide an emission clock signal to the µD 78 via the receive port (Rx). In one embodiment, the µD 78 may also communicate with upstream circuit component (e.g., RD 76) via the receive port (Rx). For instance, the µD 78 may communicate that the clock circuit has been gated off to upstream circuit components, as discussed above.

Figure 12:
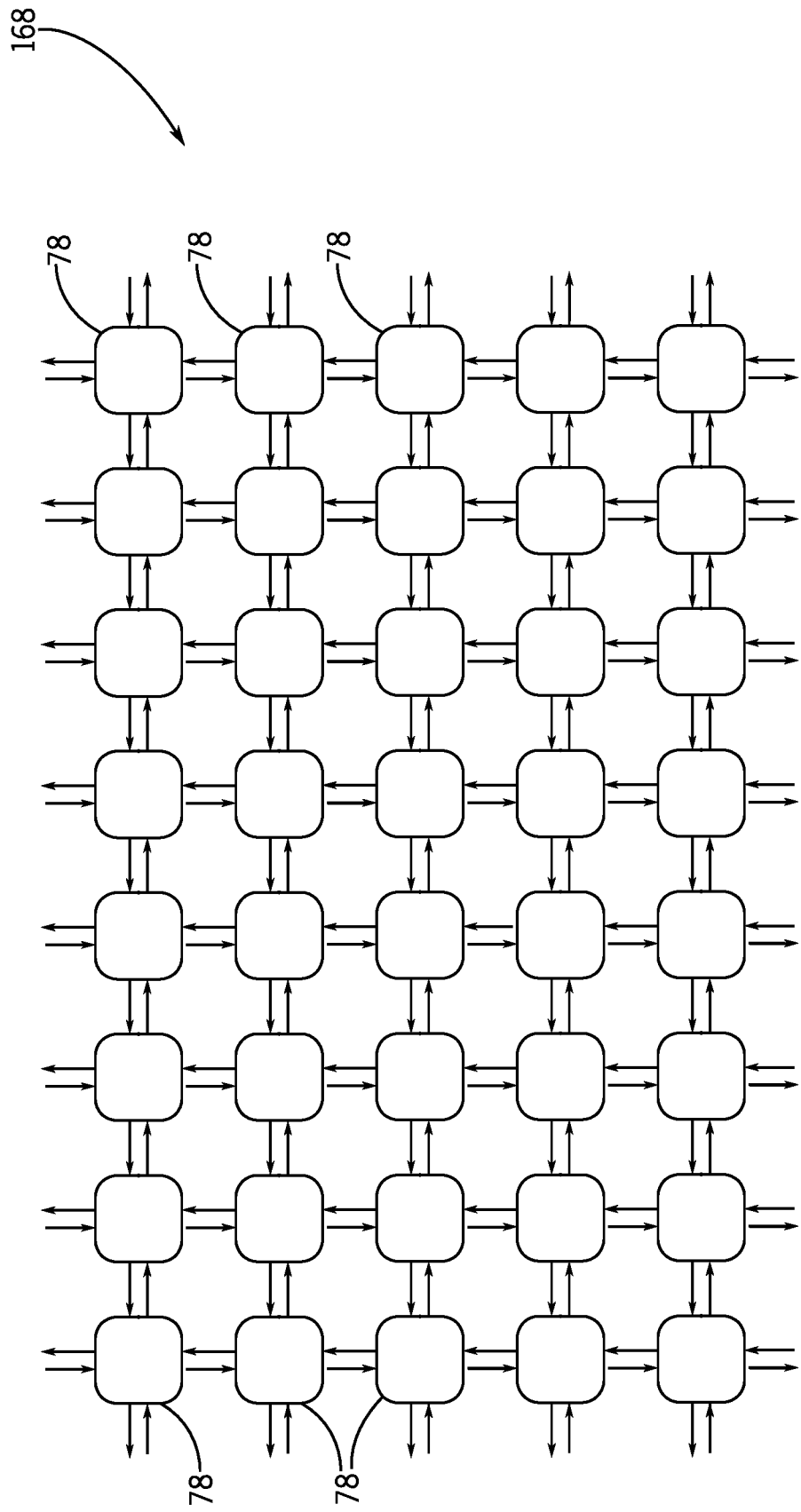
FIG. 12 is an example embodiment in which a collection of pixel driving circuits associated with a collection of pixels in a display may be coupled to each other, in accordance with embodiments described herein.

With the foregoing in mind, a collection of µDs 78, as depicted in FIG. 11, may be coupled together in a number of ways to effectively distribute an emission clock signal to a number of pixels 80 within the display 18. For example, FIG. 12 illustrates a schematic diagram of a mesh network 168 of µDs 78 coupled to each other via ports 166 discussed above. By arranging the µDs 78 in the mesh network 168, the pixels 80 may receive emission clock signals from one or more source µDs 78 and may then forward or transmit the received signals to adjacent µDs 78. As such, emission clock signals may propagate from node-to-node from a root source to end node pixels 80. As the respective clock circuits of pixel nodes begin to gate off, the clock gate signals may propagate in the opposite direction from the leaf nodes to the root source. As a result, the mesh network 168 of µDs 78 may efficiently gate off each internal clock circuits during each emission cycle to avoid using power when the respective pixels 80 are no longer emitting. After the clock circuits of each µD 78 gates off, a global emission-clock reset signal may be provided to each individual µD 78 via a direct link or via propagation by the mesh network 168. The global emission-clock reset signal may restore the clock circuits of the respective µDs 78 to a state of readiness to emit a respective gray level in accordance with the provided image data.

Figure 13:
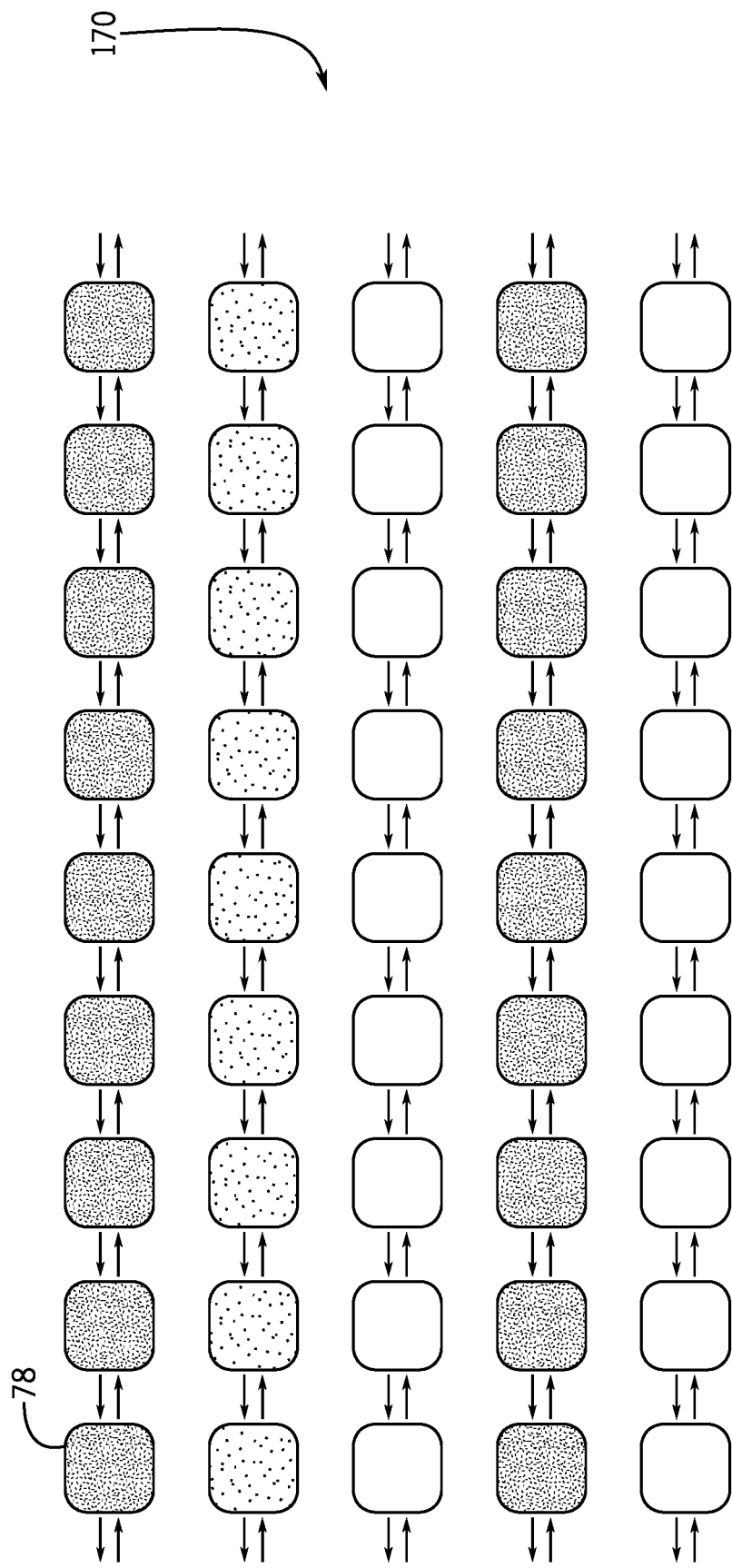
FIG. 13 is an example embodiment in which a collection of pixel driving circuits associated with a collection of pixels in a display may be coupled to each other in a row-wise manner, in accordance with embodiments described herein.

In addition to the mesh network 168 discussed above, the µDs 78 may be coupled together in a row-wise manner as illustrated in FIG. 13. The row-wise network 170 of µDs 78 may propagate emission clock signals in one direction across the display 18 and may propagate gate off signals across the display 18 in an opposite direction. In the row-wise network 170, if any pixel 80 along a row of pixels is to be activated, each µD 78 along the respective row will be clocked.

Figure 14:
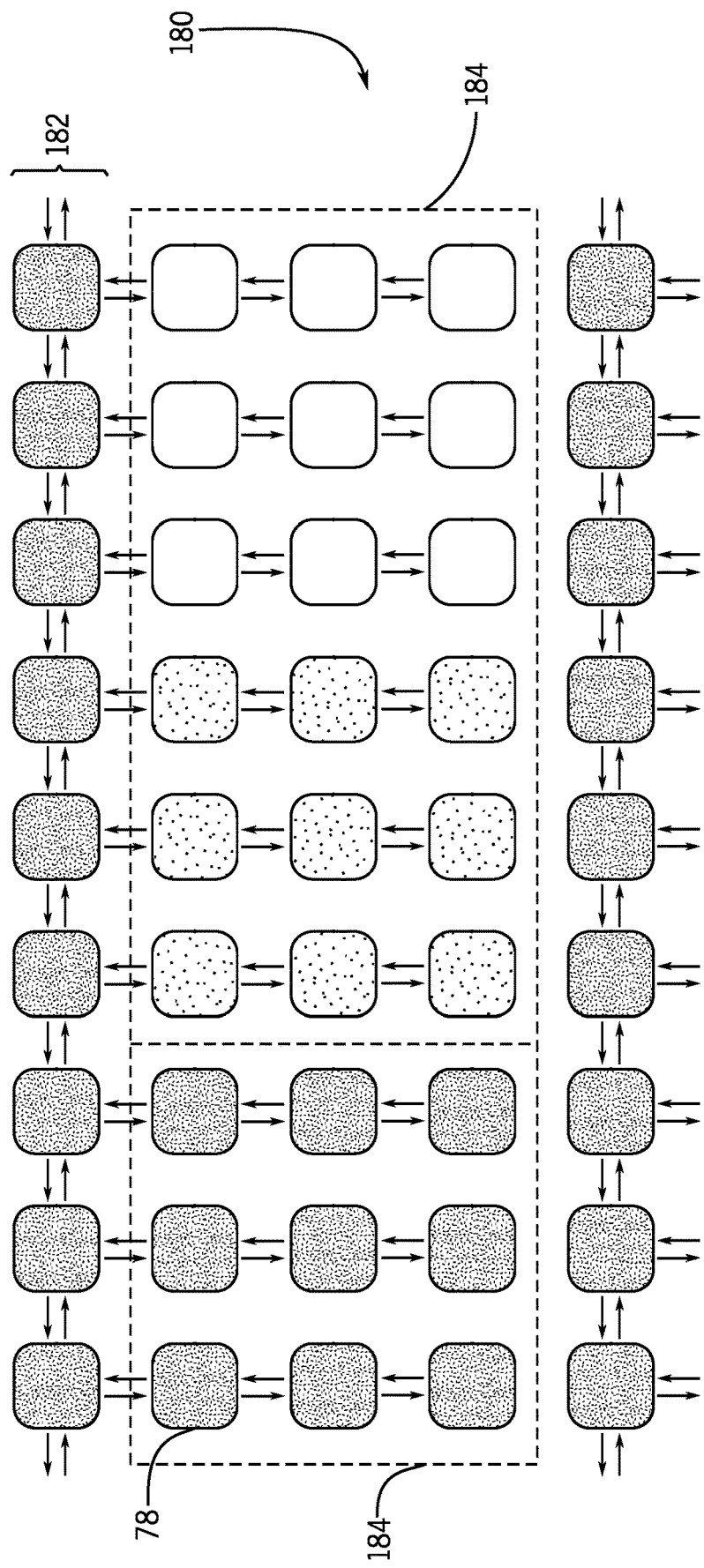
FIG. 14 is an example embodiment in which a collection of pixel driving circuits associated with a collection of pixels in a display may be coupled to each other in a tile-wise manner, in accordance with embodiments described herein.

In an alternate embodiment, the µDs 78 may be coupled together according to a tile-wise network 180, as depicted in FIG. 14. In the tile-wise network 180, a row 182 of µDs 78 may distribute an emission clock signal to different groups 184 of µDs 78. By employing the tile-wise network 180, emission clock signals may be propagated to certain groups 184 of µDs 78 that are to be illuminated. This hierarchical arrangement of µDs 78 may reduce an average global-row power consumption, while enabling a local recursive clock-gating scheme to efficiently gate off clock circuits according to the depicted image data.

In certain embodiments, the µDs 78 may be coupled together in a particular manner (e.g., row-wise, tile-wise) but may use different ports 166 during the course of displaying image data. For instance, referring to FIG. 15, if a particular µD 192 along a row 194 of µD 78 becomes unavailable or inaccessible, µDs 78 positioned adjacent to the particular µD 192 may access different ports 166 to avoid the particular µD 78. That is, the µDs 78 that may be arranged according to the row-wise network discussed above, may access another row (e.g., row 196) to traverse the particular µDs 192 and maintain communication with the remaining µDs 78 of the row 194 with the µD 192. As such, the network 190 of µDs 78 may provide redundancy to access various μDs 78 in instances when certain μDs 78 become unavailable or inaccessible.

Figure 16:
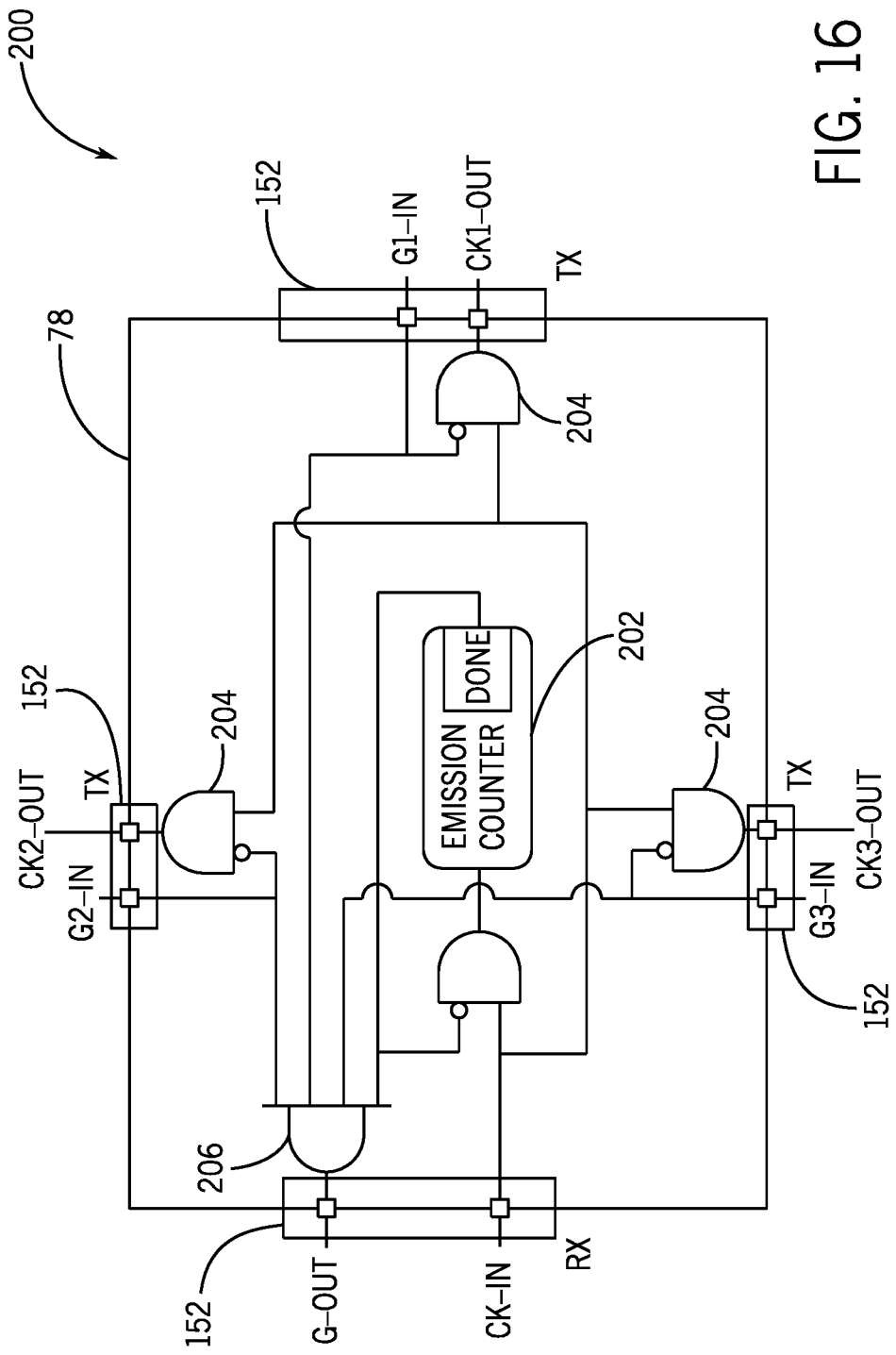
FIG. 16 illustrates a circuit diagram of a pixel driving circuit for providing clock signals to other pixel driving circuits in a display, in accordance with embodiments described herein.

With the foregoing in mind, FIG. 16 illustrates an example circuit diagram 200 that may be employed to propagate emission clock signals to various μDs 78 and to propagate gate off signals back to sources. As shown in FIG. 16, the μD 78 may include an emission clock counter 202, which may keep track of an amount of time in which a current may be provided to the μ-LED of the respective pixel 80. The receiver port (Rx) may receive an emission clock signal (ck_in), which may be propagated out via the transmit ports (Tx) via AND gates 204. According to the logic of the AND gates 204, the emission clock signal (ck_in) may be transmitted to adjacent μDs 78 when the emission clock signal (ck_in) is present and when a gate off signal is not received via the transmit ports (Tx). After the gate off signal is received via the transmit port (Tx), the respective AND gate will prevent the emission clock signal (ck_in) to be transmitted to adjacent μDs 78.

The emission counter 202 may toggle between states to keep track of an amount of time in which the respective μ-LED receives current. After the emission counter 202 reaches a count that corresponds to a desired amount of time to provide current to the respective μ-LED, the emission counter 202 may produce a done signal and provide the done signal. The done signal may cause the emission counter 202 to gate off and may also be used to indicate to upstream μDs 78 that the respective μD 78 has gated off its counter. The AND gate 206 may send a gate off signal to upstream μDs 78 or other circuit components (e.g., RD 76, clock generator 134) when the done signal has been generated and each transmit port (Tx) receives a respective gate off signal from adjacent uDs 78. In this way, the AND gate 206 may verify that the μDs 78 located downstream from the respective μD 78 have been gated off and thus are no longer emitting.

Although the example circuit diagram 200 has been described with respect to the μD 78, it should be noted that the circuit diagram 200 may be implemented in any suitable circuit that propagates emission clock signals downstream and propagates gate off signals upstream. Additionally, although the example circuit diagram 200 is illustrated with a receiver port (Rx) and transmit ports (Tx) located in certain positions with respect to the μD 78, it should be noted that the receiver port (Rx) and the transmit ports (Tx) may be positioned in any suitable manner depending on the pixel driver circuit arrangement scheme. Moreover, it should be understood that, in some embodiments, the μD 78 or other suitable circuit may use fewer transmit ports (Tx) than illustrated in FIG. 16.

Figure 15:
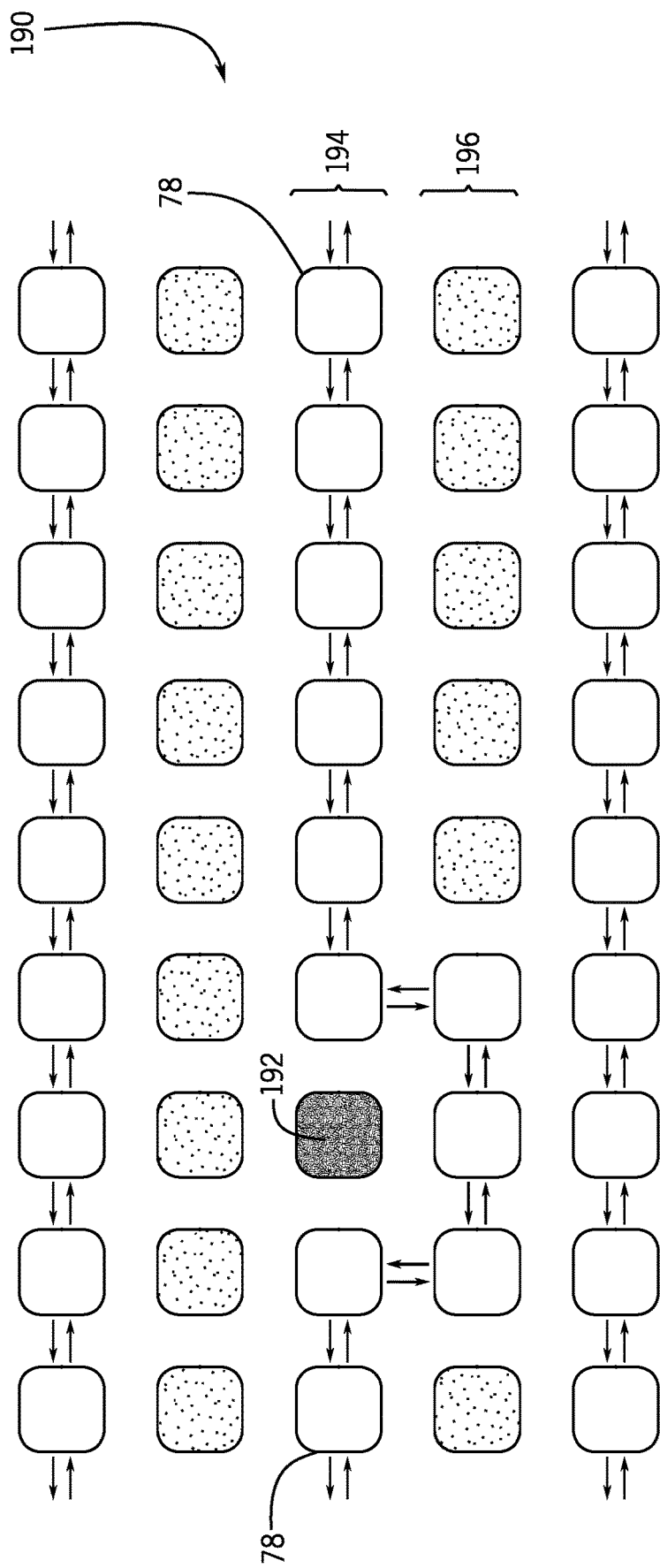
FIG. 15 is an example embodiment in which a collection of pixel driving circuits associated with a collection of pixels in a display may be coupled to each other to provide redundancy within the display, in accordance with embodiments described herein.
Figure 17:
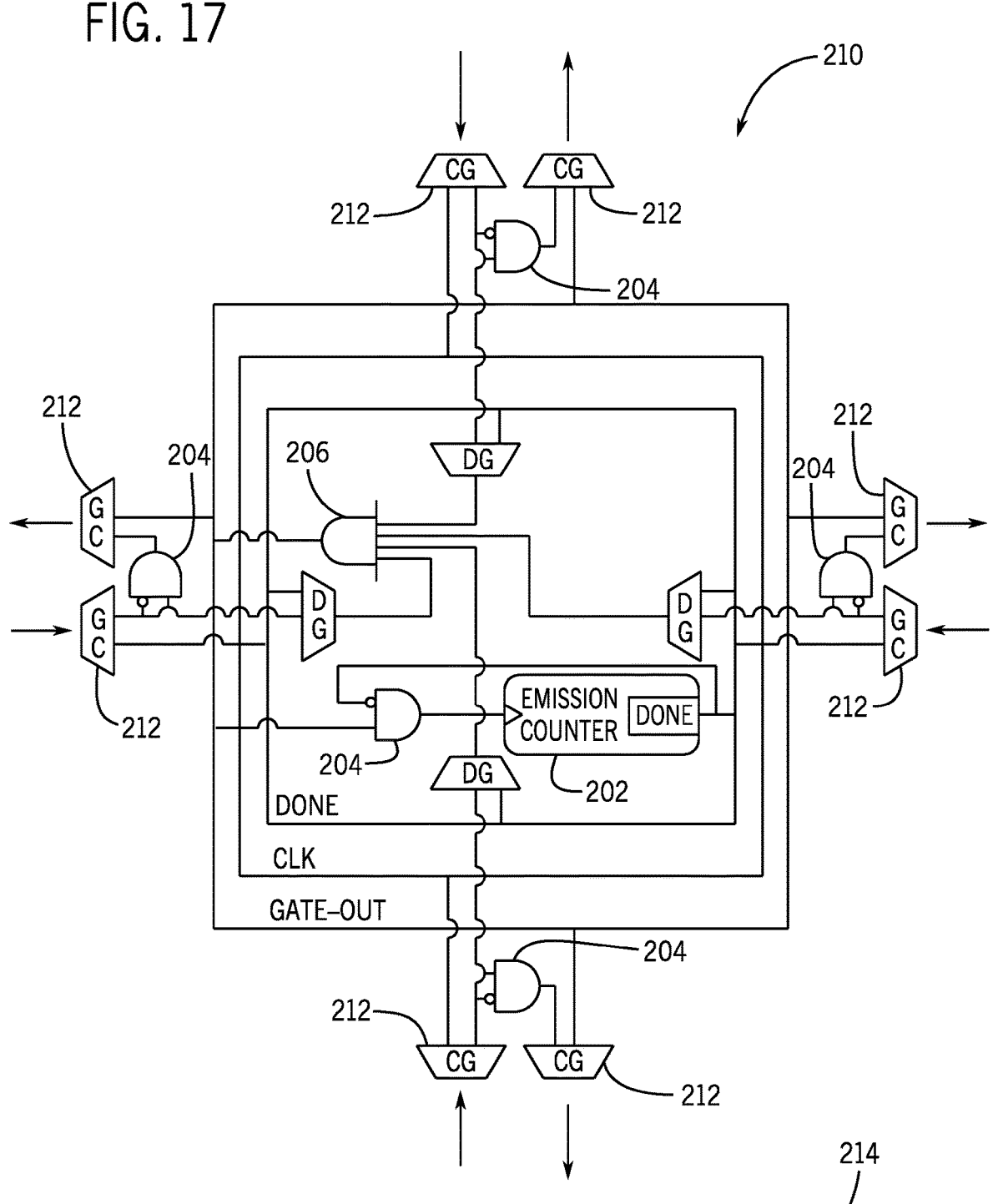
FIG. 17 illustrates a configurable circuit diagram of a pixel driving circuit for providing clock signals to other pixel driving circuits in a display, in accordance with embodiments described herein.

In certain embodiments, the μD 78 or other suitable circuit may be configured to include receiver ports (Rx) or transmit ports (Tx) at various positions within the μD 78. For instance, FIG. 17 illustrates an example circuit diagram 210 that includes the emission counter 202 and a number of AND gates 204 and 206, as discussed above. In addition, the circuit diagram 210 includes a number of multiplexers (MUX) 212. In certain embodiments, the multiplexers 212 may be programmed according to table 214 to create a receiver port (Rx) or a transmit port (Tx). By providing a way to modify the receiver port (Rx) and transmit port (Tx), various types of network schemes may be implemented for the μDs 78. In addition, the μD 78 may provide redundancy in accessing downstream pixels, as illustrated in FIG. 15, by adjusting the configuration of the ports 166 to avoid an inaccessible μD 78.

The embodiments discussed above detail a bottom-up technique for pruning or controlling the gate off signals for clock circuits in various circuits. In certain embodiments, the μD 78 may gate off its clock circuit based on data received from upstream circuit components. For instance, when a respective pixel 80 is programmed to be black (e.g., 0 gray level), an emission clock signal would not provide the respective μD 78 with any value because the respective pixel 80 will not be illuminated. With this in mind, FIG. 18 illustrates a flow chart of a method 220 for gating a clock circuit based on data provided in a header portion of pixel data that indicates that the respective pixel is black.

Figures 18, 19:
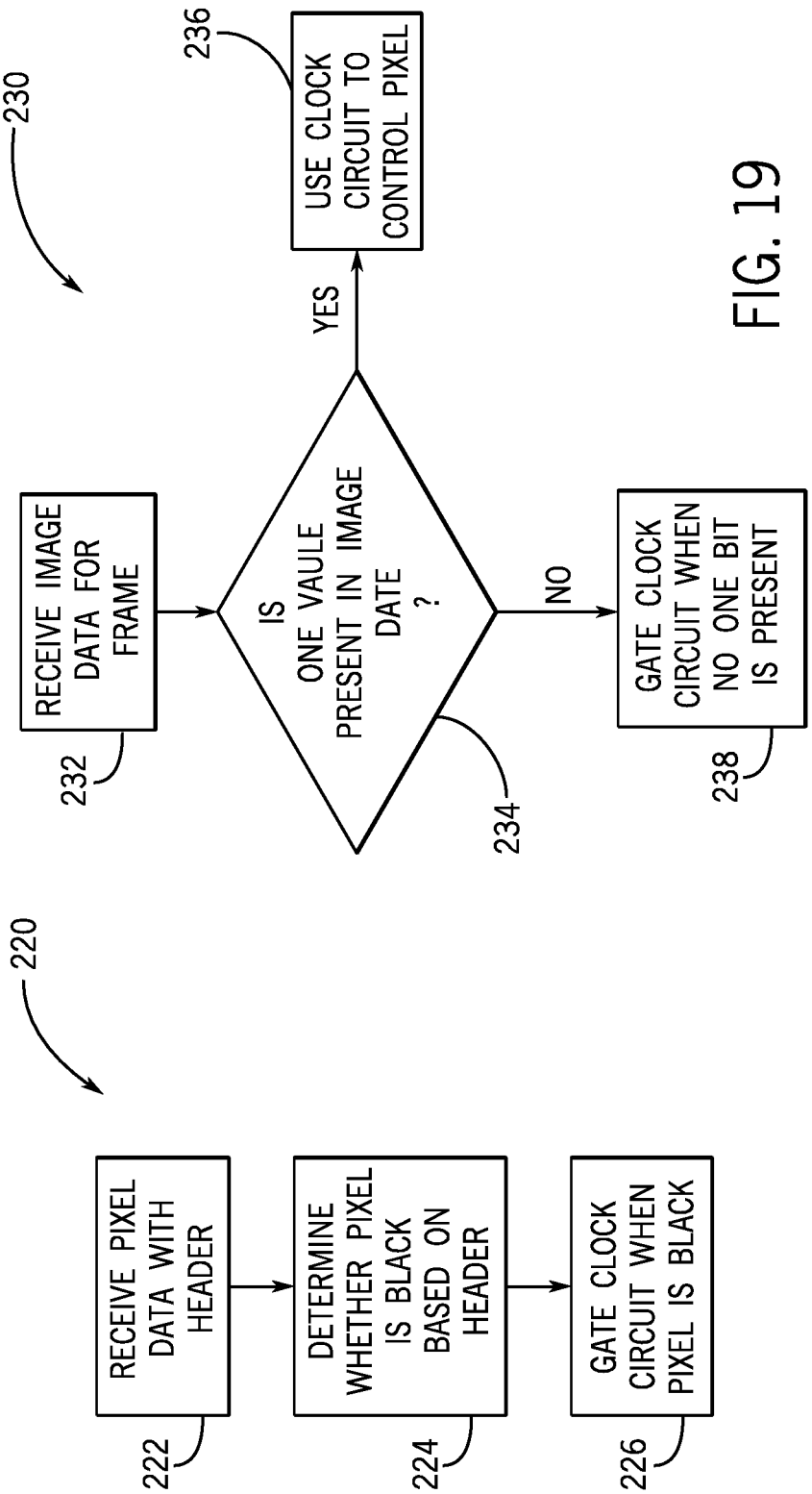
FIG. 18 illustrates a flow chart of a method for gating a clock circuit based on data provided in a header portion of pixel data, in accordance with embodiments described herein.
FIG. 19 illustrates a flow chart of a method for gating a clock circuit based on bits received regarding image data, in accordance with embodiments described herein.

Referring to FIG. 18, at block 222, the μD 78 may receive pixel data that includes a header portion in one of the first number (e.g., 2) bits of the corresponding data packet. The header portion may indicate whether the pixel data corresponds to a black color (e.g., gray level 0). If the header portion includes a one value, at block 226, the μD 78 may gate off the respective clock circuit. That is, since an emission clock signal would not be useful for a black pixel, the μD 78 may gate off the clock circuit without waiting to read the remaining bits of the pixel data. As a result, the μD 78 may save power from toggling the clock circuit even when the pixel is to be black.

In another embodiment, the μD 78 may include a monitor circuit that monitors the pixel data for a pixel during each pixel data update. The monitor circuit may generally determine whether the pixel data corresponds to a black pixel and gates off the clock circuit when the pixel is black. With this in mind, FIG. 19 illustrates a method 230 for controlling a gate off of a clock circuit based on pixel data provided during a data update for a pixel 80.

At block 232, the μD 78 (e.g., monitor circuit) may receive image data (e.g., pixel data) for a frame during a data update. At block 234, the μD 78 may monitor or scan the bits provided in the image data for a one value. As soon as the μD 78 identifies a one value, μD 78 may proceed to block 236 and use the clock circuit to control the emission of the respective μ-LED of the respective pixel 80. If, however, the μD 78 does not detect a one value in the image data for a respective pixel, the μD 78 may proceed to block 238 and gate off the clock circuit.

In certain embodiments, the method 230 may be performed by a separate monitor circuit, which may scan the pixel data prior to being provided to the μD 78. As such, the monitor circuit may anticipate whether the pixel data is to depict a black color and gate off the clock signal upon determination that the pixel will be black.

Figure 20:
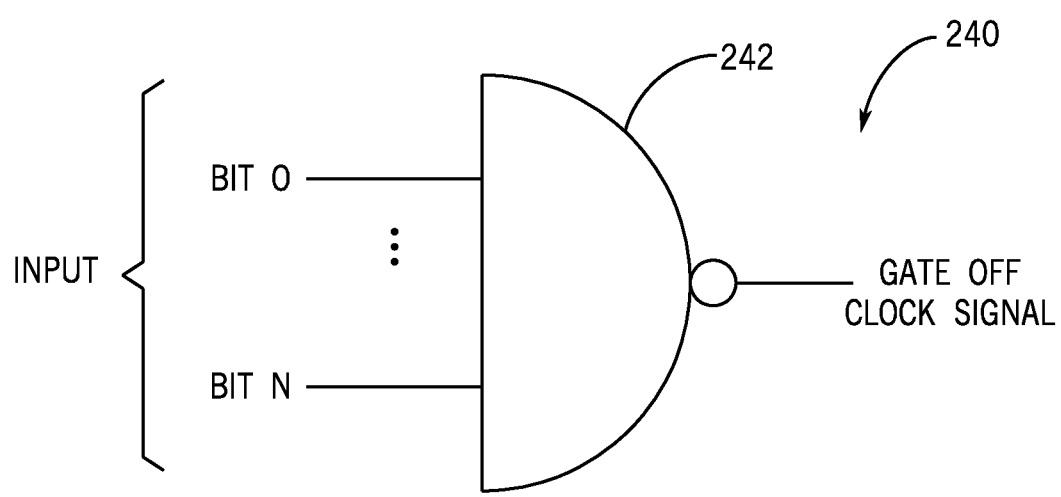
FIG. 20 illustrates an example circuit diagram of inputs received by a circuit that generates a gate off signal for a clock circuit, in accordance with embodiments described herein.

In another embodiment, the μD 78 may include a NAND gate as depicted in the example circuit diagram 240 of FIG. 20. As shown in FIG. 20, a NAND gate 242 may receive inputs (e.g., bit 0-bit N) for each bit of pixel data provided to a respective pixel 80. When each input bit is 0, the NAND gate 242 may output a gate off clock signal that may cause the clock gate to gate off.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A display device, comprising:
a plurality of pixels configured to display image data on a display; and a circuit configured to:
receive pixel data comprising a gray level for at least one pixel of the plurality of pixels, wherein the pixel data corresponds to an amount of time for providing an emission signal to the at least one pixel of the plurality of pixels to cause the at least one pixel to achieve the gray level;
receive an emission clock signal using a clock circuit, wherein the emission clock signal corresponds to a number of clock cycles output by the clock circuit, and wherein the number of clock cycles corresponds to the amount of time; and
gate off the clock circuit in response to the clock circuit outputting the number of clock cycles, wherein the clock circuit is configured to halt toggling after being gated off.

2. The display device of claim 1, wherein the circuit is configured to send an indication that the clock circuit is gated off to another circuit.

3. The display device of claim 1, wherein the circuit is a pixel driver circuit associated with the at least one pixel.

4. The display device of claim 1, wherein the circuit is a row driver circuit associated with a row of pixels of the plurality of pixels, wherein the row of pixels comprises the at least one pixel.

5. The display device of claim 1, wherein the circuit is a clock generator associated with the plurality of pixels, wherein the clock generator is coupled to a plurality of rows of pixels of the plurality of pixels.

6. The display device of claim 1, further comprising an oscillator circuit configured to provide a clock signal to the circuit, wherein the emission clock signal is generated based on the clock signal.

7. The display device of claim 1, wherein the circuit is configured to gate off the clock circuit when the gray level is zero.

8. A display device, comprising:
a plurality of pixels configured to display image data on a display; and
a first circuit configured to:
receive pixel data associated with a portion of the plurality of pixels;
determine a maximum gray level of the pixel data, wherein the maximum gray level corresponds to a maximum amount of time for providing the pixel data to at least one pixel of the portion of the plurality of pixels;
generate an emission clock signal using a clock circuit, wherein the emission clock signal corresponds to a number of clock cycles output by the clock circuit, and wherein the number of clock cycles is determined based on the maximum gray level;
transmit the emission clock signal to a second circuit configured to control an emission of the at least one pixel; and
gate off the clock circuit in response to the number of clock cycles being output by the clock circuit, wherein the clock circuit is configured to halt toggling after being gated off.

9. The display device of claim 8, wherein the first circuit is configured to send an indication that the clock circuit is gated off to a third circuit positioned upstream from the first circuit.

10. The display device of claim 9, wherein the first circuit comprises a row driver circuit associated with a row of pixels of the portion of the plurality of pixels, wherein the second circuit comprises a pixel driver circuit associated with at least one pixel, and wherein the third circuit comprises a clock generator.

11. The display device of claim 8, wherein the first circuit is configured to receive a global reset signal configured to cause the first circuit to generate a second emission clock signal based on subsequent pixel data for a subsequent frame of image data.

12. The display device of claim 8, wherein the first circuit and the second circuit are configured to control a respective emission of a respective light emitting diode.

13. The display device of claim 8, wherein the first circuit comprises a receiver port configured to receive a clock signal, wherein the clock circuit is configured to generate the emission clock signal based on the clock signal.

14. The display device of claim 8, wherein the first circuit comprises at least one transmitter port configured to transmit the emission clock signal to the second circuit.

15. A method, comprising:
receiving, via circuitry, pixel data comprising a gray level to be depicted on a pixel in a display device;
determining, via the circuitry, whether the gray level corresponds to a black color; and
gating off, via the circuitry, a clock circuit configured to control an emission clock signal for the pixel in response to the gray level corresponding to the black color, wherein the clock circuit is configured to halt toggling after being gated off.

16. The method of claim 15, wherein the pixel data comprises a header portion comprising information related to whether the pixel corresponds to the black color.

17. The method of claim 15, further comprising: scanning, via the circuitry, the pixel data for a one value and gating the clock circuit when the one value is not detected.

18. The method of claim 15, wherein gating off the clock circuit comprises receiving, via the circuitry, a plurality of bits associated with the pixel data and generating a gate off signal when each of the plurality of bits comprise a zero value.

19. The method of claim 15, further comprising generating, via the circuitry, the emission clock signal using the clock circuit when the pixel does not correspond to the black color.

20. The method of claim 19, further comprising: forwarding, via the circuitry, the emission clock signal to another circuit when the pixel does not correspond to the black color.

* * * * *